Figure 1:
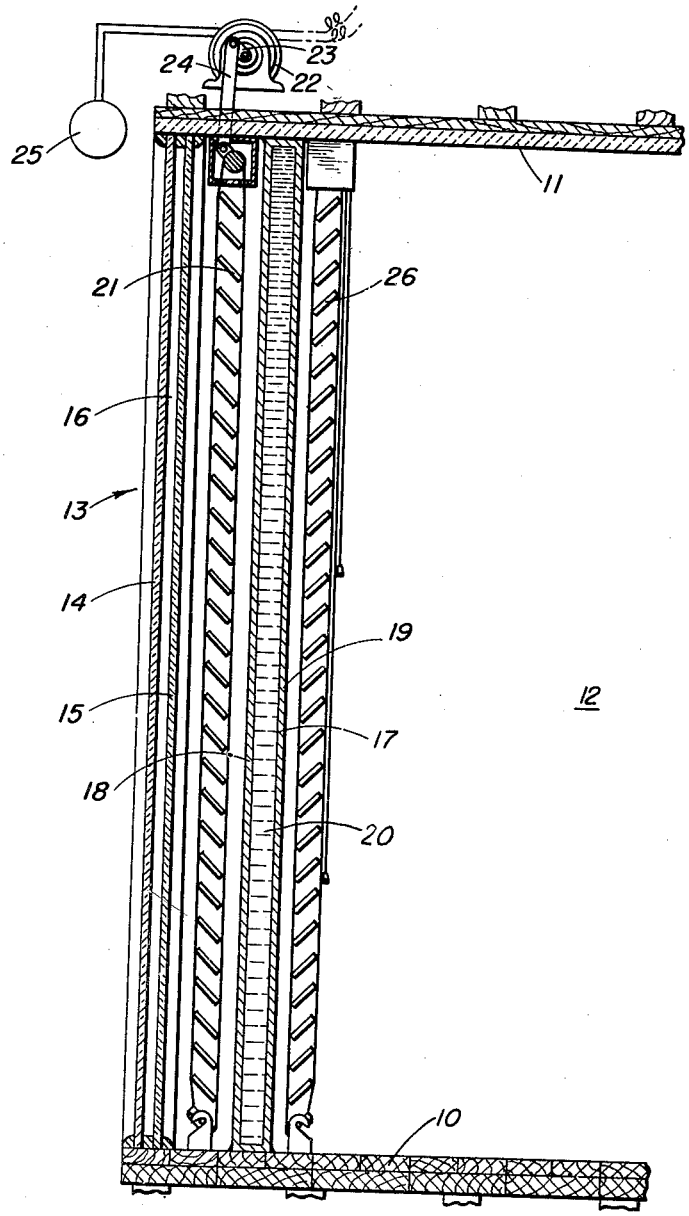

May 6, 1952      M. TELKES      2,595,905
RADIANT ENERGY HEAT TRANSFER DEVICE
Filed Aug. 29, 1946      2 SHEETS—SHEET 1

INVENTOR.
MARIA TELKES
BY
Stowell & Evans

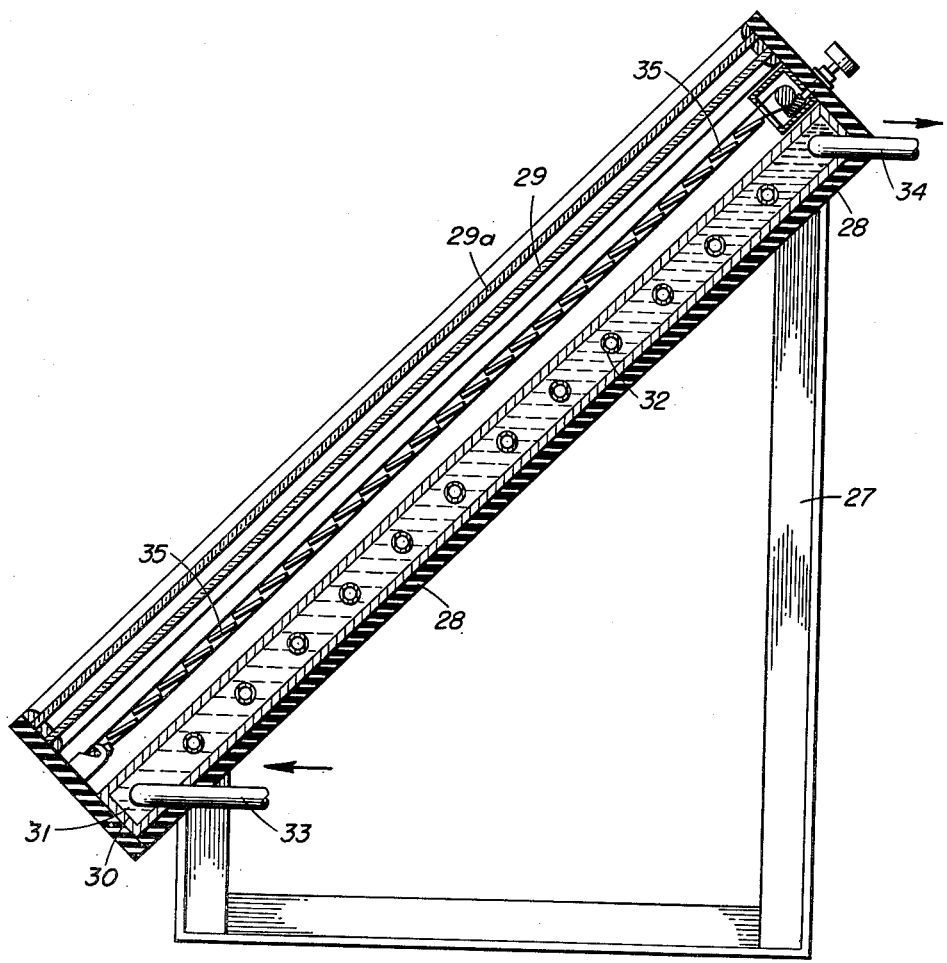

Patented May 6, 1952

2,595,905

UNITED STATES PATENT OFFICE 2,595,905

RADIANT ENERGY HEAT TRANSFER DEVICE

Maria Telkes, Boston, Mass.

Application August 29, 1946, Serial No. 693,787

3 Claims. (Cl. 126—270)

This invention relates to radiant energy heat transfer devices and particularly to heat transfer devices including a heat absorbing cell containing a heat storage and transfer medium permitting compact construction of a cell having relatively high heat capacity.

An object of the invention is to provide a radiant energy heat transfer device in the form of a cellular panel having at least one radiant energy transferring face, a heat storage medium in the cell, and means for indirect heat exchange, by radiation, conduction or convection with a space the temperature of which is to be controlled.

Another object is to provide a radiant energy heat transfer device in the form of a cellular panel adapted to form an integral part of the outside wall, or roof, of a building, and having at least one radiant energy transferring face adapted to absorb incident solar energy in the form of heat or to radiate heat to the night sky, and having a heat storage medium in heat transfer relation with a space the temperature of which is to be controlled.

Another object is to provide a solar heater including a radiation absorbing cell containing a material having a substantial heat of fusion at a temperature above about 50° F.

Another object of the invention is to provide a space cooling device including a heat radiating cell containing a material having a substantial heat of fusion at a temperature above about 50° F.

Another object is to provide a solar hot water heater having such high storage capacity that the ordinary hot water storage tank may be eliminated.

Another object is to provide cells of the type described wherein the temperature of the heat storage medium may be held accurately at a preselected temperature during long periods of heat absorption and dissipation.

A further object is to provide in a solar heater an improved construction of screen or shutter which may be automatically responsive to changes in solar radiation incident at the absorbing element of the heater.

Typically, the solar heater of the present invention includes a cell having a high absorptive capacity for a substantial range of solar radiation, a material in the cell having a substantial heat of fusion at a temperature above about 50° F., and means for indirect heat exchange between said material and a zone to be heated.

The invention will be more particularly described with reference to the drawings, in which:

Fig. 1 is a sectional view taken through the side of a building, the wall of the building including a solar heating panel in accordance with the invention, and Fig. 2 is a sectional view of a solar hot water heater embodying the principles of the invention.

In Fig. 1 of the drawings, the building shown in section has a floor 10 and a ceiling 11 partly defining a room or apartment 12. The outer wall 13, preferably a south wall in buildings situated in the northern hemisphere, is a composite wall and has an outer transparent glass plate 14 and an inner transparent glass plate 15 spaced therefrom providing a dead-air space 16 between the plates. The pair of glass plates readily transmits inwardly of the building radiant heat energy from the sun but, due to the included dead-air space 16, acts as an effective heat insulator substantially preventing the outward escape of heat by conduction and convection. By using instead of glass, especially for the inner transparent panel 15, transparent sheets of organic plastic materials, such as cellulosic materials for example regenerated cellulose, having a larger coefficient of transmission of higher frequency infrared radiation than of lower frequencies, a still greater retention of absorbed energy may be effected. More than two transparent plates may be used.

The main panel of the wall 13 takes the form of a hollow metallic cell 17 which may extend, as shown, from floor to ceiling. The outer face 18 of the cell, which is exposed to the sun, is finished to absorb a substantial range of the sun's radiation. The outer face 18 may be roughened and finished with a coating of dull black paint to provide an excellent absorbing surface. The interior face 19 of the cell forms the interior wall of the room 12 and may be decoratively finished as desired.

The hollow interior of the cell is substantially filled with a substance that has a fusion point at or about the temperature at which it is desired to maintain the wall and also having a relatively high latent heat of fusion. I have found that the substance known as Glauber's salt, the deca-hydrate of sodium sulfate, is particularly suited for use in the heating of houses; it has a melting point of 90° F., and a relatively high heat of fusion of 103 B. t. u. per pound. The cell is substantially completely filled with Glauber's salt 20.

The cell 17 may be built from a number of prefabricated units of convenient size, some of which may be provided with window openings or the units may be so grouped as to provide window openings. In general, cells having a thickness of six to eight inches will be found to be satisfactory for most applications of the invention. The cell units are preferably made structurally strong enough to provide a self-sustaining wall, and may, in some instances, even support the overhead structure of the building.

Between the outer face 18 of the cell and the inner glass plate 15 is hung a curtain or shutter 21 having a highly reflecting inner surface. The shutter may be of the Venetian-blind type and is opened when the sun is shining and closed on dark days or at night.

The blind may be manually operable, or, as narily exceed the fusion temperature of the material.

By way of illustration, some of the materials suitable for use in heater cells are listed in the following table together with some of the physical constants of the materials and the quantities needed for calculated cell thicknesses. The basis of the table is one square foot of cell surface absorbing solar energy in the amount of 1400 B. t. u. per day, which amount may be considered as the maximum solar energy available on a clear winter day from a vertical surface facing south in the area of Boston, Massachusetts. The figures are based on a room temperature and basis temperature of 70° F.

| Material | Melting point, °F. | Heat of fusion, B. t. u./ lbs. | Spec. heat, solid | Density, lbs/ cu. ft. | Stored at M. P., B. t. u./lbs. | Needed for storing 1,400 B. t. u. per day/sq. ft. | |
|---|---|---|---|---|---|---|---|
| | | | | | | Lbs. | Cell thickness (Inches) |
| $CaCl_2.6H_2O$ | 84 | 73 | .32 | 105 | 78 | 18.0 | 2.05 |
| $Na_2SO_4.10H_2O$ | 90 | 103 | .40 | 91 | 111 | 12.6 | 1.66 |
| $Na_2HPO_4.12H_2O$ | 95 | 120 | .43 | 95 | 131 | 10.7 | 1.35 |
| $Ca(NO_3)_2.4H_2O$ | 108 | 61 | .35 | 114 | 74 | 18.8 | 1.95 |
| $Na_2S_2O_3.5H_2O$ | 120 | 86 | .43 | 108 | 108 | 13.0 | 1.45 |
| $NaCH_3COO.3H_2O$ | 137 | 69 | .60 | 91 | 109 | 12.8 | 1.69 | shown, automatic means may be provided for opening and closing the blind in response to the condition of solar radiation incident upon the heater. Such automatic means may include an electric motor 22 having an arm 23 connected by a link 24 to the blind, the motor being so wired and the arm and link assembly so connected and arranged that when the blind is closed and the motor is initially energized it will run for half a revolution of the arm 23 to open the blind and will then automatically stop. Another initial energization will cause similar functioning to close the blind. Since motors of this type are well known in the art, further detailed description is believed to be unnecessary.

The motor is controlled by a radiant energy-sensitive element 25 placed outside of the building, the element being adjusted to initiate action of the motor 22 to open the blind when the solar energy level exceeds a predetermined value and to close the blind when the solar energy level falls below the predetermined point.

A second Venetian blind 26 or other curtain may be provided to selectively cover and uncover the inner face 19 of the cell to control the temperature of the room 12. This curtain may be manually operated or automatically operated in response to room temperature by conventional means (not shown). The inner blind may advantageously be constructed to provide air circulation from the room across the inner face of the cell.

In operation, when the sun is shining, its rays fall upon the absorptive surface 18 of the cell and heat the material within the cell to its melting point. Additional heat imparted to the cell is absorbed in the material at its fusion temperature, the material being selected with regard to the temperature desired in the wall. The cell thickness is preferably so chosen, keeping in mind the rate of heat dissipation from the cell and other pertinent factors, that the cell will absorb all of the average daily incident solar radiation without melting the last increment of material; thus, the desired wall temperature will not ordinarily exceed the fusion temperature of the material.

From the foregoing description, it will be seen that there has been provided a solar apartment heater including a cell containing a heat storage and transfer material and adapted to absorb solar energy at one surface and radiate heat at another surface. Instead of radiating heat from the inner face of the cell to the space to be heated, heat may be transferred to such a space, particularly if remotely located, by the circulation of air or water between the cell and the space to be heated.

The principles of the invention may be also embodied in a solar hot water heater such as that shown by way of example in Fig. 2. Referring to this figure, it will be seen that the heater is inclined to face the sun at its zenith and is supported at the desired angle by a framework 27. The heater includes an open-faced shallow box 28, covered by a pair of spaced parallel transparent plates 29 and 29a, and containing a cell 30 substantially filled with a material like those referred to in connection with the wall heater hereinbefore described. In the case of hot water heaters, it may be desirable to use a latent heat storing material having a higher melting point than the materials used in wall heaters, and preferably from about 90° to about 150° F. For this purpose I have found the penta-hydrate of sodium thiosulfate, commonly known as hypo, to be admirably suited. From the foregoing table, it will be seen that hypo has a melting point or phase transformation temperature of 120° F., a high enough temperature for most domestic uses. It will also be seen that it has a relatively high heat of fusion of 86 B. t. u. per pound.

Within the cell 30 there is disposed in contact with the heat storing substance a pipe coil 32 through which is circulated water to be heated. The water may be led to the coil through inlet 33 and drawn from the coil through outlet 34 to be passed to a domestic hot water system or the like. As in the wall heater, the hot water heater of Fig. 2 may have an adjustable shutter 35 which may be manually or automatically operable.

Due to the high latent heat storage capacity of the material 31 filling the cell 30, the usual hot water storage tank may be dispensed with.

By providing a cell of the general construction of the cell of Fig. 2 in a wall or roof having a northern aspect, the cell may be effectively used for cooling purposes. In this use heat is radiated to the night sky thereby cooling the heat storage medium below its solidification temperature. During the daytime, louvers or other shading devices, preferably automatic actuated, shade the cell from the sun, and heat from a space to be cooled is transferred to the heat storage medium, by the circulation of liquid as shown in Fig. 2, by the circulation of air from the space to be cooled over the cell, or by transfer directly through the inner face of the cell.

When the cell is used for cooling purposes a heat storage medium having a relatively low solidification point, for example, from 50° to 65° F., is desirable. Such a medium can be provided by the admixture of 10 to 25% of sodium chloride with Glauber's salt.

The addition of borax to the Glauber's salt with or without the addition of sodium chloride, is generally desirable as it prevents supercooling of the Glauber's salt and also inhibits corrosion.

Cells containing a heat storage medium solidifying at 50° to 65° F. may also advantageously be used in maintaining the temperature of greenhouses and other plant growing spaces. For such purposes the cells may be positioned in or under the roof of the greenhouse, for example, to absorb solar radiation during the day and thereafter maintain or aid in maintaining the desired temperature during the night by the radiation, conduction or convection of heat from the storage medium.

It will be seen from the foregoing description that wide variation in details of construction and arrangement is possible without departing from the principles of the invention.

By the term "zone to be heated," as used in the description and in the appended claims, I mean to include broadly any zone such as the room space of a building, the point of use of domestic hot water, or the like, and the term "outer wall" is intended to include the roof of a structure.

I claim:

1. Wall construction for a building comprising an outer panel transmitting a substantial range of solar radiation, and an inner panel spaced from said outer panel comprising a hollow cell having an extended surface adapted to absorb a substantial range of solar radiation facing said outer panel and positioned to intercept radiation transmitted thereby and a second extended surface facing inwardly of the building and positioned to dissipate heat thereinto, and a material in said cell having a substantial heat of fusion and a melting point in the temperature range from about 50° F. to about 150° F.

2. Wall construction as defined in claim 1 including a curtain positioned in the space between said panels and means for actuating said curtain to selectively cover and uncover the extended surface of said cell facing said outer panel.

3. Wall construction as defined in claim 2 including power means for actuating said curtain and light-sensitive means exposed to solar radiation for controlling said power means in accordance with the magnitude of solar radiation incident thereon.

MARIA TELKES.

REFERENCES CITED

The following references are of record in the file of this patent:

UNITED STATES PATENTS

| Number | Name | Date |
|---|---|---|
| 224,507 | Ancelin | Feb. 7, 1880 |
| 246,626 | Morse | Sept. 6, 1881 |
| 247,393 | Nieske | Sept. 20, 1881 |
| 412,725 | Calver | Oct. 15, 1889 |
| 780,352 | Kafka | Jan. 17, 1905 |
| 1,081,098 | De La Garza | Dec. 9, 1913 |
| 1,673,429 | Vinson | June 12, 1928 |
| 1,729,818 | Burgess | Oct. 1, 1929 |
| 1,887,618 | Bell | Nov. 15, 1932 |
| 1,951,403 | Goddard | Mar. 20, 1934 |
| 2,191,198 | Gould | Feb. 20, 1940 |
| 2,271,648 | Kleist | Feb. 3, 1942 |
| 2,342,211 | Newton | Feb. 22, 1944 |
| 2,388,940 | Taylor | Nov. 13, 1945 |
| 2,428,876 | Hawkins | Oct. 14, 1947 |

FOREIGN PATENTS

| Number | Country | Date |
|---|---|---|
| 19,560 | Great Britain | Sept. 8, 1914 |